United States Patent [19]
Priola et al.

[11] 3,965,078
[45] June 22, 1976

[54] PROCEDURE FOR THE PRODUCTION OF POLYMERS AND COPOLYMERS OF ISOBUTYLENE

[75] Inventors: Aldo Priola; Sebastiano Cesca; Giuseppe Ferraris, all of San Donato, Italy

[73] Assignee: Snam Progetti S.p.A., San Donato, Milan, Italy

[22] Filed: Sept. 6, 1974

[21] Appl. No.: 503,599

Related U.S. Application Data

[63] Continuation of Ser. No. 306,911, Nov. 15, 1972, abandoned.

[30] Foreign Application Priority Data

Nov. 26, 1971, Italy .................................. 31725/71

[52] U.S. Cl. ............................... 526/154; 526/188; 526/339
[51] Int. Cl.² ..................... C08F 4/52; C08F 210/12
[58] Field of Search ............................ 260/85.3 R

[56] References Cited
UNITED STATES PATENTS

| | | | |
|---|---|---|---|
| 2,581,154 | 1/1952 | Walsh, Jr. et al. | 260/85.3 R |
| 2,931,791 | 4/1960 | Ernst et al. | 260/85.3 R |
| 3,231,547 | 1/1966 | Darcy et al. | 260/85.3 R |
| 3,493,549 | 2/1970 | Uemura et al. | 260/85.3 R |
| 3,631,013 | 12/1971 | Horie | 260/85.3 R |
| 3,850,896 | 11/1974 | Priola et al. | 260/85.3 R |

*Primary Examiner*—Alan Holler
*Attorney, Agent, or Firm*—Ralph M. Watson

[57] ABSTRACT

A method is described for the polymerization of isobutylene and, in particular, the copolymerization of isobutylene and isoprene to produce butyl rubber, by contacting the monomers with a catalyst prepared from: (a) an organoaluminum compound (e.g. $Al(C_2H_5)_2Cl$) and (b) a compound represented by the formula $X'_n M_e Y_m$ in which $X'$ is a halogen atom; Y is oxygen, sulphur or a functional group selected from the alkoxies, esters, amides, simple or substituted alkyls, cycloalkyls, aromatics, arenes, phosphines, acetylacetones and oximes; Me is an element selected from Ti, Sn, Zn, B, Al, Hg, Pb, W, Sb, Ge, V, Zr, As, Bi and Mo; n and m are whole numbers whose sum equals the valence of Me except where Y is oxygen or sulphur, when the valency equals $2m + n$, (e.g. $Ti(O\ nC_4H_9)Cl_3$), in a liquid reaction medium constituted by an aliphatic, aromatic, cycloaliphatic or halogenated hydrocarbon such as methyl chloride, and at a temperature in the range from $-100°$ to $30°C$.

6 Claims, No Drawings

PROCEDURE FOR THE PRODUCTION OF POLYMERS AND COPOLYMERS OF ISOBUTYLENE

This is a continuation, of application Ser. No. 306,911 filed Nov 15, 1972, now abandoned.

This invention refers to a procedure for the production of polymers and co-polymers of isobutylene using a particular catalyst system which enables us to utilize higher reaction temperatures than those previously used industrially; it also enables us to obtain higher yields in polymers having a higher molecular weight and generally better properties, logically dependent upon the operative conditions selected and other factors known to the technical field itself.

More particularly, this invention refers to an invention for the production of butyl rubber. It is well known that butyl rubber is industrially produced by means of a process of copolymerization achieved by utilizing cationic type initiators. In particulr, the copolymerization is achieved utilizing $Al\ Cl_3$ in ethyl chloride or in methyl chloride solution at $-100°C$.

The use of a solid catalyst insoluble in common hydrocarbon solvents and only slightly soluble in chlorine containing solvents, has created many difficulties in the realization of an efficacious control of this reaction. We note that the preparation of the catalyst solution was already somewhat complex, and that in general, it is done by means of a passage of a current of ethyl chloride or methyl chloride on a bed of solid aluminum trichloride. Also the subsequent determination of the concentration of the catalyst that is effected through titration of the $Al\ Cl_3$ gives complex and often very unexpected results.

It is evident from the above that in this last period there has been much effort on the part of various researchers and industries interested in the production of this type of rubber, towards the discovery of new catalyst systems that would simultaneously solve the problems of the preparation of the catalyst and the raising of the temperature of the polymerization, without, of course, compromising the properties of the rubber and, in particular, without lowering the value of the molecular weight. Recently some researchers perfected a new soluble catalyst that enables us to obtain butyl rubber with a high molecular weight at considerably higher temperatures than those normally used in industrial processes.

The system in question derives from a combination of a haloid of Friedel-Crafts "modified", for example $Al\ Et_2\ Cl$, with an appropriate co-catalyst. These haloids are not usually capable of initiating the polymerization of isobutylene by themselves, or in mixtures of isobutylene-monomers-dienes or other monomers that normally polymerize with a cationic type mechanism.

The polymerization of co-polymerization begins only when the co-catalyst is introduced. This co-catalyst may be composed of a substance able to produce protons, such as, for example $H\ Cl$ and other acids of Bronsted, or by a substance capable of supplying carbon ions, such as, for example, t-butyl chloride.

The assignee of this copending application also owns a patent application, Ser. No. 195,423, filed Nov. 3, 1971, pertaining to a procedure for the production of butyl rubber by means of the use of a catalyst system constituted by a reducing alluminium compound and by a co-catalyst capable of giving cations for interaction with the catalyst. The co-catalyst may be a halogen introduced as such, or other interhalogenic compounds.

The process which has now been perfected by us, and which constitutes the subject of this application, presents all the advantages of the catalyst systems mentioned previously which are essentially associated with considerable ease to the control of the polymerization reaction owing to the solubility of these catalysts in common organic solvents, so that whenever necessary, it is possible to operate with minimum quantities of solvent, or even in its total absence in which case, the same non-reacted monomer functions as a diluent.

In respect to the processes using haloids of dialkyl alluminum and strong acids, it is distinguished by the use of real co-catalysts which, inactive by themselves, only originate a polymerization catalyst by interaction with the other components of the system. Besides, the catalyst activity of the systems claimed takes place with moderation permitting an easier control of the polymerization reaction thus making it possible to originate a polymer having a physical aspect much more favourable to an industrial realization because of the higher subdivision of the clumps of elastomer produced in the polymerization.

Then, in contradistinction to the system using halogen or interhalogenic solutions, it has the great advantage of easier handling of the compounds used as catalysts.

Although this application essentially concerns the production of butyl rubber, in view of the industrial interest in this, it will be easy for the expert on the subject, using the catalyst system described herein, to find the ideal conditions for the copolymerization of different monomers. In particular, the usable monoolefin may include from 4 to 7 carbon atoms while the muctiolefine is generally constituted by diolefins conjugated with from 4 to 14 carbon atoms ($C_4 - C_{14}$), such as isoprene, butadiene, 2,3 dimetyl, 1,3 butadiene, while examples of the first may be isobutene, 2-methyl-butene-1, 3-methyl-butene-1, 2-methyl-butene-2, 4-methylpentene-1.

As we already stated, only great industrial interest has caused us to limit our examples to the case of butyl rubber, that is, to the copolymerization of isobutylene and isoprene in quantities variable from 90 to 99.5% in isobutylene weight and from 10 to 0.5% in isoprene weight. The reaction media used are those which are normally used in the technical field, that is, ethyl chloride, methyl chloride or methylene chloride. However, it is also possible to use hydrocarbon compositions that are liquid at the temperature of reaction, such as pentane, isopentane, n-heptane, cyclohexane or even solvents maintained in a liquid phase at the temperature of reaction, such as, for example, the monomer or the monomers used.

The molecular weights of the product obtained vary over a considerable range according to the conditions adopted. The catalyst system of the invention includes:

a. a metalorganic comound of aluminium having the formula $AlR_3$ or $AlR_2X$ where X is an atom of halogen, and R is a hydrocarbon radical with from 1 to 10 carbon atoms or hydrogen;

b. a compound of formula $X'_n MeY_m$ in which $X'$ is a halogen atom; Y is oxygen, sulphur or functional group selected for example from among the alkoxies (—OR), esters (— O — COR), amides (—$NR_2$), alkyls (—R), simple or substituted, cycloalkyls (—C), aromatics (Ar), arenes, (delocalized bonds between pseudoaromatic rings or aromatics and transition metals) phosphines (—PR$_2$) acetylacetones (—COCH$_2$COCH$_2$R), oximes (=C=N — O —) where R has the above meanings; Me is an element selected from among the following: Ti, Sn, Zn, Si, B, Al, Hg, Pb, W, Sb, Ge, V, Zr, As, Bi, Mo; n and m are whole numbers whose sum is equal to the valence of Me, except in the case in which Y is oxygen or sulphur in which it becomes 2m + n.

Specific examples of these co-catalysts are: TiCl$_3$ (OR), RSnCl$_3$, R$_2$SnCl$_2$, R$_3$SnCl, (Aryl)$_3$SnCl RZnCl, HSiSl$_3$, RSiCl$_3$, R$_2$SiCl$_2$, Cl$_2$Ti (OCOCH$_3$)$_2$, R$_3$SiCl, BF$_2$OR, AlOCl, RHgCl, R$_2$PbCl$_2$, WCl$_5$ (OR), WCl$_4$ (OR)$_2$, C$_5$H$_5$TiCl$_3$, SnCl$_3$ (NR$_2$), (C$_6$H$_5$)$_3$ SbCl$_2$, CH$_3$GeCl$_3$, Ti(Acac)$_2$ Cl$_2$, VCl$_2$ (NR$_2$)$_2$, ZrCl$_2$ (OCOCH$_3$)$_2$, Cl$_2$AsOR, CH$_3$AsI$_2$, ArBiCl$_2$, Ar$_3$SbCl$_2$, SiOCl$_2$, ZrOCl$_2$, TiOCl$_2$, SnSCl$_2$, R SnSCl, SnOCL$_2$, RSnOCl, CH$_3$ COOSnOCl, RPbOCl, VOCl$_2$, MoOCl, MoOBR, MoOCl. (AR = Aryl)

The catalyst may be preformed, or preferably the co-catalyst is added as portions in a second phase in the reaction. The molar ratio, however between the total quantity of compound (b) and compound (a) is always less than 1, preferably between 0.5 and 10$^{-4}$.

In the practice of our invention, the copolymerization reaction is effected at a temperature between —100 and +30°C.

The molecular weights of the polymers prepared in the following examples were obtained through viscosimetric measures of polymer solutions in cyclohexane at 30°C. After having determined the intrinsic viscosity by extrapolation at c=0 of the curves 1n ($\eta_r$/c and $\eta_{sp}$/C, the average molecular weight of the single polymers was calculated by the following equation.

$$\ln M_v = 11.98 + 1.452 \, 1m \, [\eta]$$

The invention will be more clearly comprehensible from an examination of the following examples, by which however, it should not be understood to be limited.

EXAMPLE 1

In a tubular reactor completely made of glass, having a capacity of 300 cm$^3$, provided with a mechanical agitator and a thermometric sheath, previously heated wwith flame under dry Argon flow and maintained during the execution of the experiment, under a slight positive pressure of Argon, (20 – 30 torr in respect to the atmospheric pressure), we condensed 80 cm3 of CH$_3$Cl, and then we introduced 28.4 grams of isobutene, 0.84 grams of isobutylene and 2 mmoles (cc0.254) of AlEt$_2$Cl bringing the temperature to —40°C by means of a thermostatic bath.

To the reaction mixture, kept under strong shaking, are subsequently added 0.15 mmoles of Ti (0 nC$_4$H$_9$) Cl$_3$ dissolved in CH$_3$ Cl gradually over a period of 12 minutes for which we had an increase in the temperature of the reaction mixture in the amount of 4°C. We continued the shaking for 5 minutes after the end of the addition and then we stopped the reaction by adding methanol to the suspension of the polymer which is produced.

We obtained 19.65g of dry polymer (yields=69.3%) which presents a value of [$\eta$]to determined in cyclohexane, equal to 2.20 dl/g which corresponds to an average viscosimetric molecular weight equal to 480,000 and a content of unsaturations, determined iodometrically, corresponding to 3.15% in isoprene weight. The average molecular weight in numbers $\overline{M}_n$, determined with a Mechrolab apparatus, Mod. 502, was equal to 226,000. The polymer was also examined with apparatus GPC (mod.200 Waters Ass.) using as solvent trichlorobenzole at a temperature of 130°C with the purpose of obtaining the distribution curve of the molecular weights. We obtained a monomodal distribution curve of the PM's from which we obtained a value of $\overline{M}_w/\overline{M}_n$ = 2.4. The same determination carried out on various samples of commercial butyl rubber supplied values of $M_w/M_n$ included between 2.1 and 2.6.

The polymer obtained was made to undergo vulcanization in split plates using a mixture of the following composition prepared on an open mixer with cylinders:

| | |
|---|---|
| Polymer | 100 parts |
| EPC black | 50 parts |
| Antioxidant 2246 | 1 part |
| ZnO | 5 parts |
| Stearic Acid | 3 parts |
| Sulphur | 2 parts |
| MB-TSD (mercapto-benzotniazole-disulfide) | 0.5 part |
| TMTD (tetramethyl-thiurame-disulfide) | 1 part |

The mixture was vulcanized at 153°C for 40 and 60 minutes. The properties of the vulcanized products obtained were collected in Table 1, in Table 2 we gathered for the sake of comparison, the properties of a commercial type of butyl rubber determined under the same conditions.

TABLE 1

| | | |
|---|---|---|
| Vulcanization time (minutes | 40 | 60 |
| Modulus at 100% (Kg/cm$^2$) | 16 | 19 |
| Modulus at 200% (Kg/cm$^2$) | 29 | 35 |
| Modulus at 300% (Kg/cm$^2$) | 47 | 60 |
| Breaking load (Kg/cm$^2$) | 214 | 215 |
| Elongation at break (%) | 730 | 670 |
| Permanent set (%) | 37 | 35 |

TABLE 2

| | | |
|---|---|---|
| Vulcanization time (*) minutes | 40 | 60 |
| Modulus at 100% (Kg/cm$^2$) | 15 | 16 |
| Modulus at 200% (Kg/cm$^2$) | 27 | 33 |
| Modulus at 300% (Kg/cm$^2$) | 47 | 58 |
| Breaking load (Kg/cm$^2$) | 209 | 210 |
| Elongation at break (%) | 715 | 650 |
| Permanent set (%) | 29 | 29 |

(*) Butyl rubber Enyay B 218 with a viscosimetric molecular weight equal to approximately 450,000 and contents of unsaturations equal to 2.15% in isoprene weight.

The above reported results show that the polymer obtained in this experiment, conducted at a temperature included between 36° and 40°C, presents, after vulcanization, properties equal to those of commercial butyl rubber, which, as we all know, is produced at a temperature inferior to —100°C.

EXAMPLE 2

We repeated the previous experiment with the same quantity of reagents with the difference that we did not use AlEt$_2$Cl and we did use quantities of Ti (O-n-C$_4$H$_9$)Cl$_3$ five times greater than those used in the previous experiment, (a total of 0.75 mmoles).

There was no polymer formation.

This experiment proves that Ti(On. C$_4$H$_9$)Cl$_3$ is not able to start by itself the polymerization of our reaction mixture even in concentrations that are considerably higher than those used in example 1.

EXAMPLE 3

We repeated the experiment described in example 1 with the difference that we used as a co-catalyst, a solution of $CH_3Cl$ containing 0.3 mmoles of $Ti(On.C_4H_9)_2Cl_2$. We carried out the addition at a temperature of $-40°C$ for a period of 3 minutes, continuing the shaking for 20 minutes. We obtained no formation of polymers, and not even after a subsequent addition of 2 moles of $AlEt_2Cl$. This experiment demonstrates that the catalyst activity ascertained in example 1 is not attributable to exchange reactions between the Al alkyl and the Ti alcoholated but strictly depends on the type of Al alkyl and the alcoholate used.

EXAMPLE 4

With the same methods, described in example 1, we introduced into the reactor the same quantities of solvent monomers and $AlEt_2Cl$.

The reaction was started at a temperature of $-40°C$ by means of gradual introduction of a solution of $CH_3Cl$, of 0.4 mmoles of $Si(CH_3)Cl_3$ for a period of 4 minutes for which we had an increase in temperature in the amount of 3°C. We obtained the formation of 5.5g of dry polymer (yield = 19.5%) having a $[\eta]$ equal to 2.45 dl/g (M W = 570,000) and an unsaturation contents equal to 2.10% in isoprene weight. The polymer was made to undergo vulcanization as described in example 1 and the properties of the vulcanized products are shown in Table 3.

TABLE 3

| | | |
|---|---|---|
| Vulcanization time (minutes) | 40 | 60 |
| Modulus at 100% (Kg/Cm²) | 15 | 16 |
| Modulus at 200% (Kg/Cm²) | 24 | 30 |
| Modulus at 300% (Kg/Cm²) | 39 | 52 |
| Breaking load (Kg/Cm²) | 207 | 220 |
| Breaking length (%) | 715 | 680 |
| Permanent set (%) | 31 | 30 |

We may therefore conclude that the properties of the polymer obtained are very similar to those of the typical commerical samples of butyl rubber.

EXAMPLE 5

We repeated the previous experiment with the difference that we did not use $AlEt_2Cl$ and we did use quantities of $Si(CH_3)Cl_3$, five times greater than those used in example 4 (in total 2 mmoles). There was no formation of polymer. Besides, if we repeated the experiment described in Example 4 using the same quantities of reagents and $AlEt_2Cl$ and using 0.5 mmoles of $Si(CH_3)_3Cl$ as a co-catalyst, no formation of polymer is obtained.

EXAMPLE 6

With the same methods reported in example 1, we introduced into the reactor the same quantities of solvent, monomers and $AlEt_2Cl$.

The reaction was started at a temperature of $-40°C$ through a gradual introduction into the shaken reaction mixture of a solution of $CH_3Cl$ containing 0.18 mmoles of $Sn(C_2H_5)_3Cl$ for the duration of two minutes for which we had an increase in temperature in the amount of 11°C.

We obtained g. 19.75 of dry polymer (yield = 69.5%) having a $[\eta] = 1.79$ dl/g ($PM_v = 360,000$) and a content of unsaturation equal to 3.2% in isoprene weight.

The polymer was made to undergo vulcanization as in example 1 and the properties of the vulcanized product are reported in Table 4.

TABLE 4

| | | |
|---|---|---|
| Vulcanization time (minutes) | 40 | 60 |
| Modulus at 100% (Kg/cm²) | 15 | 17 |
| Modulus at 200 (Kg/cm²) | 25 | 29 |
| Modulus at 300% (Kg/cm²) | 43 | 51 |
| Breaking load (Kg/cm²) | 209 | 210 |
| Breaking lenght (%) | 760 | 680 |
| Permanent set (%) | 38 | 35 |

As we may see from table 4, the properties of the polymer are very similar to those of a typical commercial sample of a butyl rubber. (Compare table 2.)

The sample was also examined with a CPC apparatus (mod. 200 Waters Ass.) as described in example 1. We obtained a monomodal curve of the distrubution of the molecular weights from which we extracted a value of $\overline{M}_w/\overline{M}_n = 2.67$.

EXAMPLE 7

We repeated the previous experiment with the difference that we did not use $AlEt_2Cl$ and we used instead $Sn(C_2H_5)_3Cl$ by itself in quantities 5 times greater than those indicated in example 6 (0.9 mmoles).

We obtained no formation of polymer. Besides, if the experiment described in example 6 is repeated using the same quantities of reagents and $AlEt_2Cl$ and using 0.36 mmoles of $Sn(Et)_4$ as a co-catalyst, no formation of polymer is obtained.

EXAMPLE 8

We repeated the experiment described in example 6 with the difference that we used as a co-catalyst a solution in $CH_3Cl$ containing 0.05 mmoles of $Sn(C_2H_5)Cl_3$ added slowly to reaction mixture for a period of 6 minutes at a temperature of 40°C for which we had a temperature increase in the amount of 18°C. We obtained g 25.3 of dry polymer (yield = 89%) having $[\eta]$ equal to 1.40 dl/g ($PM_v = 250,000$) and contents of unsaturations equal to 3.05% of isoprene weight. If this experiment is repeated using $Sn(C_2H_5)Cl_3$ by itself, that is without $AlEt_2Cl$, in quantities five times greater than the one reported above, (a total of 0.25 moles) there is no polymer formation.

EXAMPLE 9

We repeated the experiment described in Example 6 with the difference that we used as a co-catalyst a solution in $CH_3Cl$ containing 0.05 mmoles of $Sn(CH_3)_2Cl_2$ added slowly to the reaction mixture for a period of 5 minutes for which we had a temperature increase in the amount of 7°C. We obtained g 18.1 of dry polymer (yield = 64%) having a $[\eta]$ equal to 1.88 dl/g ($PM_v = 380,000$) and contents of unsaturations equal to 2.85% in isoprene weight. If we repeat this experiment using $Sn(CH_3)_2Cl_2$ by itself, that is without $AlEt_2Cl$, in quantities five times greater than those reported above (a total of 0.25 mmoles), no formation of polymers is obtained.

EXAMPLE 10

We operated with the same technique described in example 1 with the difference that we used as a co-catalyst a solution in $CH_3Cl$ containing 0.5 mmoles of $SiHCl_3$ that are added slowly to the mixture of reaction in a period of 8 minutes for which we had a temperature increase in the amount of 2°C. We obtained 14.7 g of dry polymer (yield = 51.8%) having a $[\eta]$ equal to 1.63 dl/g ($PM_v = 315,000$) and contents of unsaturation equal to 2.2% in isoprene weight. If we repeat this experiment using $SiHCl_3$, by itself, that is without $AlEt_2Cl$, in quantities five times greater than those reported above (a total of 2.5 mmoles) there is no formation of polymers.

EXAMPLE 11

We repeated the previous experiment with the difference that we used as a catalyst 1 mmole of $AlEt_2Br$ and as a co-catalyst a solution in $CH_3Cl$ containing 0.4 moles of $SiHCl_3$. We carried out the addition at −40°C for a period of 9 minutes for which we had an increase of temperature in the amount of 5°C. We obtained 25.4 g of dry polymer (yield = 89.5%) having a $[\eta] = 1.55$ dl/g ($PM_v = 990,000$) and unsaturation contents equal to 3.15% in isoprene weight.

EXAMPLE 12

We operated as per the previous example with the difference that we used as a catalyst 2 mmoles of $AlEt_2I$, and as a co-catalyst, a solution in $CH_3Cl$ containing 0.6 mmoles of $Sn(CH_3)_3Cl_2$ added for a duration of 3 minutes to the reaction mixture for which we had an increase of temperature in the amount of 4°C. We obtained 16.37 g of dry polymer (Yield = 57.6%), having a $[\eta] = 1.41$ dl/g ($PM_v = 250,000$) and contents of unsaturations equal to 2.22% in isoprene weight.

EXAMPLE 13

We operated as described in the previous example with the difference that we used as a catalyst 2 mmoles of $AlEt_2F$ and, as a co-catalyst, a solution in $CH_3Cl$ containing 0.32 mmoles of $Sn(CH_3)_2Cl_2$, added to the reaction mixture in a time of 3 minutes for which we noticed an increase in temperature in the amount of 1.5°C. We obtained 4.88 g. of dry polymer having $[\eta] = 1.55$ dl/g ($PM_v = 250,000$) and contents of unsaturations equal to 2.6% in isoprene weight.

EXAMPLE 14

We repeated the previous experiment with the difference that we used as a catalyst 2 mmoles of $AlEt_2Cl$, and as a co-catalyst, a solution in $CH_3Cl$ containing 0.22 mmoles of $Sn(C_6H_5)$, added to the reaction mixture over a period of 14 minutes for which we had an increase in temperature in the amount of 5°C. We obtained 20.75g of dry polymer (yield = 79%) having $[\eta] = 1.3$ dl/g ($PM_v = 240,000$) and contents in unsaturations equal to 2.4% of isoprene weight.

The $Sn(C_6H_5)_3Cl$ alone, that is, without $AlEt_2Cl$ did not start the polymerization even when using quantities of it that were 5 times greater than those used in this experiment.

EXAMPLE 15

We operated as described in the previous example with the difference that we used as co-catalyst 0.4 mmoles of $Ti(OCOCH_3)_2Cl_2$ added slowly at the temperature of 40°C over a period of 3 minutes for which we had an increase of temperature of 4°C. We obtained d 15.25 of dry polymer (yield = 53.5%) having $[\eta]$ equal to 1.66 dl/g ($PM_v = 320,000$) and contents of unsaturations equal to 3.15 in isoprene weight.

The $Ti(OCOCH_n)_2Cl_2$ used in polymerization alone, that is, without $AlEt_2Cl$ in the same experimental conditions, did not achieve the formation of polymer.

EXAMPLE 16

We used, operating at the same conditions as the previous example, as a catalyst 2 mmoles of $AlEt_2Cl$, and, as a co-catalyst 0.2 mmoles of $Sn(OCOCH_3)_2Cl_2$ added slowly at a temperature of −40°C over a period of 7 minutes for which we had an increase in temperature in the amount of 6°C. We obtained g 16.5 of dry polymer (yield = 58%) having $[\eta]$ equal to 1.96 dl/g ($PM_v = 410,000$) and unsaturations contents equal to 2.9% in isoprene weight.

The $Sn(OCOCH_n)_2Cl_2$ used by itself in polymerization, that is, without $AlEt_2Cl$ in the same conditions, did not achieve the formation polymer.

EXAMPLE 17

We operated as described in the previous example with the difference that we substituted as a solvent $CH_3Cl$ with the n-pentane. We then used, as a catalyst, 2 mmoles of $AlEt_2Cl$ and as a co-catalyst 0.5 mmoles of $Sn(C_2H_5)Cl_3$ dissolved in n-pentane. We carried out the addition of the co-catalyst over a period of 2 minutes for which we noted a temperature increase of 11°C and the formation of a viscous solution of polymer. After turning off, we obtained 14.15g of dry polymer (yield = 49.7%) having a viscosimetric average molecular weight equal to 85,000 and contents of unsaturations equal to 2.35% in isoprene weight.

We claim:

1. Process for the production of copolymers of isobutylene and a conjugated diene wherein the copolymerization reaction is conducted in the presence of a catalyst system consisting of:
   a. a metalorganic compound of aluminum having the formula $AlR_2X$, wherein X is a halogen atom and R is a hydrocarbon radical having from 1 to 10 carbon atoms or hydrogen; and
   b. a compound selected from the group consisting of $Ti(OnC_4H_9)Cl_3$, $Ti(OCOCH_3)_2Cl_2$, $Si(CH_3)Cl_3$, $SiHCl_3$, $Sn(C_2H_5)_3Cl$, $Sn(C_2H_5)Cl_3$, $Sn(CH_3)_2Cl_2$, $Sn(C_6H_5)_3Cl$, $Sn(OCOCH_3)_2Cl_2$ and $Sn(C_2H_5)Cl_3$.

2. Process according to claim 1 wherein the polymerization reaction is effected in the presence of a reaction median selected from the aliphatic, aromatic, cycloaliphatic, mono- and poly-halogenated hydrocarbons.

3. Process according to claim 2 wherein the reaction medium used is methyl chloride.

4. Process according to claim 1 wherein the copolymerization reaction is effected at a temperature between −100° and +30°C.

5. Process according to claim 1 wherein the isobutylene is copolymerized with isoprene.

6. Process according to claim 5 wherein the copolymerization reaction is effected by feeding to the zone of reaction a mixture of isobutylene and isoprene in quantities variable from 90% to 99.5% of isobutylene by weight and from 10 to 0.5% of isoprene by weight.

* * * * *

UNITED STATES PATENT AND TRADEMARK OFFICE
CERTIFICATE OF CORRECTION

PATENT NO. : 3,965,078  
DATED : June 22, 1976  
INVENTOR(S) : Aldo Priola, Sebastiano Cesca and Giuseppe Ferraris Page 1 of 2

It is certified that error appears in the above-identified patent and that said Letters Patent are hereby corrected as shown below:

Column 2, line 7, "to the" (first occurance) was changed to

--of-- per Amendment filed September 6, 1974.

line 59, Correct spelling of "compound" and

"aluminum".

Column 3, line 19, "(AR=Aryl)" should read --(Ar=Aryl)--.

line 46, Correct spelling of "with".

lines 50-51, Delete "isobutene" and substitute

--isobutylene--.

line 51, Correct "isobutylene" to read --isoprene--.

line 64, Before "determined" delete "to".

Column 4, line 7 of composition, Correct spelling of

"benzothiazole".

line 55, Correct "presents" to read --possesses--.

UNITED STATES PATENT OFFICE
CERTIFICATE OF CORRECTION

Patent No. 3,965,078    Dated June 22, 1976

Inventor(s) Aldo Priola, Sebastiano Cesca and Giuseppe Ferraris

It is certified that error appears in the above-identified patent and that said Letters Patent are hereby corrected as shown below:

Column 7, line 50, Correct "$Sn(C_6H_5)$" to read

-- $Sn(C_6H_5)_3Cl$ --.

Signed and Sealed this

Thirty-first Day of May 1977

[SEAL]

Attest:

RUTH C. MASON
Attesting Officer

C. MARSHALL DANN
Commissioner of Patents and Trademarks